US012268971B1

(12) United States Patent
Hebner et al.

(10) Patent No.: US 12,268,971 B1
(45) Date of Patent: Apr. 8, 2025

(54) PROBABILITY DEMONSTRATOR

(71) Applicant: Index Fund Advisors, Inc., Irvine, CA (US)

(72) Inventors: Mark T. Hebner, Irvine, CA (US); Philip Poissant, Toronto (CA)

(73) Assignee: Index Fund Advisors, Inc., Irvine, CA (US)

( * ) Notice: Subject to any disclaimer, the term of this patent is extended or adjusted under 35 U.S.C. 154(b) by 0 days.

(21) Appl. No.: 18/195,871

(22) Filed: May 10, 2023

(51) Int. Cl.
*A63F 3/04* (2006.01)
*G09B 19/18* (2006.01)
*G09B 23/02* (2006.01)

(52) U.S. Cl.
CPC ............ *A63F 3/0457* (2013.01); *G09B 19/18* (2013.01); *G09B 23/02* (2013.01)

(58) Field of Classification Search
CPC ........ A63F 3/0457; G09B 19/18; G09B 23/02
See application file for complete search history.

(56) References Cited

U.S. PATENT DOCUMENTS

| 2,037,064 | A | | 10/1934 | Burdick |
|---|---|---|---|---|
| 2,103,151 | A | | 12/1937 | Dietrich |
| 2,789,371 | A | | 4/1957 | Shanhouse |
| 2,838,851 | A | | 6/1958 | Lusser |
| D192,221 | S | * | 2/1962 | Ruchlis .................. D19/62 |
| 3,717,941 | A | | 2/1973 | Tomerlin |
| D267,961 | S | | 2/1983 | Bjon |
| 4,403,775 | A | | 9/1983 | Chaput |
| D275,972 | S | | 10/1984 | Bahier |
| D284,292 | S | | 6/1986 | Smirne |
| D298,556 | S | | 11/1988 | Gigliotti |
| 4,822,048 | A | | 4/1989 | Axup |
| D301,487 | S | | 6/1989 | Audet |
| 4,900,255 | A | | 2/1990 | Laghi |
| D306,747 | S | | 3/1990 | Gigliotti |
| 4,930,779 | A | | 6/1990 | Maddox |

(Continued)

OTHER PUBLICATIONS

Galton Board, Four Pines Publishing, May 7, 2018, retrieved from the internet: https://youtu.be/EvHiee7gs9Y?si=GCKAjLJI-MFpialQ (Year: 2018).*

(Continued)

*Primary Examiner* — Eddy Saint-Vil
(74) *Attorney, Agent, or Firm* — James M. Duncan; Scanlon Duncan LLP

(57) ABSTRACT

A probability demonstrator has a transparent housing having a bead reservoir at the top of the housing, a plurality of pegs disposed in a triangular matrix configuration in a midportion of the housing, and a plurality of parallel bead bins disposed at a bottom portion of the housing. Spherical beads are enclosed within the housing. The spherical beads are loaded into the bead reservoir by rotating the housing on its central pivots. When rotated again, the spherical beads cascade through the triangular matrix and come to rest within the plurality of bead bins. The probability demonstrator is configured to allow bead flow through the device without hanging up through any part of the device until the spherical beads come to rest within the bead bins, resulting in a histogram showing a normal distribution. A single larger diameter spherical bead may be included with the plurality of spherical beads to demonstrate a single random outcome.

23 Claims, 7 Drawing Sheets

(56) References Cited

U.S. PATENT DOCUMENTS

| | | |
|---|---|---|
| 4,936,576 A | 6/1990 | Farraj |
| 5,011,148 A | 4/1991 | Stebing |
| D317,471 S | 6/1991 | Rizzo et al. |
| D321,669 S | 11/1991 | Hoehne |
| 5,117,982 A | 6/1992 | Shotthafer et al. |
| D331,777 S | 12/1992 | Sedlmeier et al. |
| 5,265,877 A | 11/1993 | Boylan et al. |
| 5,328,172 A | 7/1994 | Jagiella |
| D375,764 S | 11/1996 | Hollinger |
| D377,806 S | 2/1997 | Samucha |
| D379,472 S | 5/1997 | Smith |
| D411,253 S | 6/1999 | Wong |
| D419,202 S | 6/2000 | Johns |
| D445,140 S | 7/2001 | Odenwalt |
| 6,382,413 B1 * | 5/2002 | Nakamura ......... G11B 33/0444 206/307 |
| 6,385,810 B1 * | 5/2002 | Lang ....................... A47L 9/102 15/352 |
| 6,655,687 B2 | 12/2003 | Sanchez-Seco |
| D531,672 S | 11/2006 | Hannon |
| D633,685 S | 3/2011 | Caffee et al. |
| D670,094 S | 11/2012 | Prestandrea et al. |
| D694,832 S | 12/2013 | Garcia |
| D757,571 S | 5/2016 | Newson |
| D784,449 S | 4/2017 | Hebner |
| 2013/0053123 A1 | 2/2013 | Nicely et al. |
| 2015/0302775 A1 | 10/2015 | Matsushima |

OTHER PUBLICATIONS

The Dance of Chance Probability Machine, Aug. 1, 2016, http://www.theexhibitguys.com/Galton_Probability_Machine.html.
Galton Board, Four Pines Publishing, Aug. 2018, https://www.youtube.com/watch?v=EvHiee7gs9Y.
The Galton Board: Math in Motion, Four Pines Publishiing, Aug. 2018, https://www.youtube.com/watch?v=SZoDNfVFS71.
Ruchlis, Marcus, Hexstat Probability Demonstrator Teacher's Manual, pp. 1-17, 1965, Harcourt, Brace & World, Inc.

* cited by examiner

PROBABILITY DEMONSTRATOR

BACKGROUND OF THE INVENTION

The Galton Board was invented by Sir Francis Galton in 1873 to demonstrate the central limit theorem which states that, given certain conditions, the average of a sufficiently large number of samples of independent variables, each with a well-defined expected value and well-defined variance, will be normally distributed. In other words, a binomial distribution approximates a normal distribution.

The known Galton board has a vertical board with outwardly extending interleaved rows of pegs arranged in a triangular pattern called a quincunx peg matrix. Balls, marbles, spherical beads or the like (collectively referred to herein as "beads") are dropped from top of the board. As a bead reaches the first peg it "decides" to go left or right. Upon reaching a second peg, the bead makes another "decision" on which way to turn. For each turn, there is a fifty percent chance of going left or right.

After falling through the entire quincunx peg matrix, the beads are collected into a plurality of divided bins at the bottom of the board. Once all of the beads have fallen through the matrix of pegs and gathered within the bins, it has been empirically demonstrated that the middlemost bin will have collected the most beads, with fewer beads collected in the bins on either side of the middlemost bin, with the number of beads collected within each bin progressively decreasing the further the bin is from the middlemost bin. If each bin has a fixed height and an equivalent width, it may be observed from a viewpoint at the front of the board that height of the beads gathered in the bins extending from one side of the board to the other approximately define a bell curve, i.e., a normal distribution, thereby demonstrating the central limit theorem. The central limit theorem says that the sampling distribution of the mean will always be normally distributed, as long as the sample size is large enough. In other words, the Galton Board allows the viewer to visualize the order embedded in "the chaos of randomness."

While the Galton Board is very useful in demonstrating the central limit theorem, each time the Galton Board was used, the original device required "reloading" beads at the top of the board by turning the board over.

SUMMARY OF THE INVENTION

Embodiments of the present invention provide an improved Galton Board with Pascal's Triangle (referred to hereinafter as a "probability demonstrator") which can demonstrate not only the central limit theorem, but which also includes modifications which allow the device to demonstrate multiple principles in probability, mathematics, and finance. These principles include probability theories, binomial distribution, regression to the mean, and the law of large numbers and probabilities, such as coin flipping and stock market returns. Although the path taken by each bead through a peg matrix configured as Pascal's Triangle is never the same, the visual cascade of beads always results in a similar Bell Curve of normal distribution as depicted by a histogram formed by the level of beads deposited in a plurality of parallel bins at the lower end of the device. The device is designed to sit on a desktop with the transparent front face of the device in an "at rest" position, angled towards the viewer's perspective at approximately 76 degrees to present optimum user viewing.

An embodiment of the probability demonstrator has a housing having an interior comprising a top portion, a middle portion, and a bottom portion, wherein the top portion, the middle portion and the bottom portion of the housing are consecutively arranged along an axis. The housing has a front face and a rear panel which enclose the interior, where the front face is transparent. A plurality of spherical beads is disposed within the interior. The inventors herein have found that a visually pleasing display is provided by using approximately six thousand spherical beads, each having a diameter of approximately 1 millimeter, in a housing which is approximately 6½ wide by 12 inches tall.

In one embodiment, the housing may be configured such that the combination of the top portion and middle portion forms a square and the lower portion is a rectangle with side lengths having the golden ratio of 1.618, thereby defining a golden rectangle. In such configuration, the combination of the lower portion to the top portion and middle portion also forms a golden rectangle.

Embodiments of the present invention further provide for easy reloading of the beads to the top of the board by simply flipping the device upside down or rotating the housing about its pivots to return beads from the bead bins at the bottom portion of the device to the bead reservoir at the top portion of the device. It is to be understood that the terms "top portion" and "bottom portion" refer to the relative positions of the housing in a "resting" position, i.e., with the beads disposed in the bins. To provide accurate demonstrations of the various principles, embodiments of the present invention include features which allow for bead flow through the device without hanging up through any part of the device. Specifically, embodiments of the apparatus are configured so that the flow of approximately 6,000 beads through an opening of approximately 3.5 millimeters occurs without bead hang up or blockage. Flow of the beads into the bead reservoir is both fast and consistent.

The probability demonstrator has a bead reservoir disposed in the top portion of the housing with the bead reservoir connected to the middle portion by a single conduit. The bead reservoir has a first depth defined by the space between an upper inside surface of the front face and an upper inside surface of the rear panel.

The probability demonstrator also has a plurality of pegs disposed in the middle portion of the housing with the pegs disposed in a quincunx matrix configured as Pascal's Triangle. While the individual pegs may have a variety of shapes (i.e., round, triangular, pentagonal), the embodiment disclosed in the accompanying figures has individual pegs having a hexagonal shape. The middle portion of the board has a second depth defined by a space between a middle inside surface of the front face and a middle inside surface of the rear panel.

A plurality of bead bins are disposed in parallel configuration in the bottom portion of the housing. Each bin has an open end adjacent the middle portion of the housing and a closed end adjacent a bottom edge of the bottom portion of the housing. Each of the bins are in parallel alignment with the vertical axis. The bottom portion has a third depth defined by the space between a bottom inside surface of the front face and a bottom inside surface of the rear panel.

The above-described top portion, middle portion and bottom portion are so configured that the first depth is greater than the second depth and the second depth is greater than the third depth. This configuration enables the beads to flow through the device so as to accurately demonstrate the various principles with minimal bead hang up or jamming.

Embodiments of the present invention may also allow an observer to track a single bead as it flows from the bead reservoir through the quincunx matrix of hexagonal pegs and comes to rest in a specific bead bin at the bottom portion. The observable final disposition of a single bead among the thousands of other beads demonstrates a single random outcome. The front face of the housing may be printed with information which provides percentage estimates of a probability that this single bead will land in a specific bin and allow an observer can witness those probabilities in action.

The present invention may further facilitate the tracking of a single bead by utilizing a color and size for this single bead which are different from the color and size of the thousands of other beads. This single bead is referred to herein as the "golden bead" although the use of any color different from that of the remaining beads is acceptable. Identification of the "golden bead" is further enhanced by significantly increasing the size of the golden bead from the thousands of the other beads. In one embodiment, the golden bead has a diameter of approximately 2.2 millimeters while the remaining beads (approximately 6,000) have a diameter of approximately 1.0 millimeters.

The use of a single bead having a larger diameter from the thousands of the other beads presents non-obvious design challenges to allow the larger diameter bead to behave in a similar manner as the smaller diameter beads. The variable depth configuration of the device allows the golden bead to be introduced into the thousands of uniform beads contained within the demonstrator yet still provide a free flow of the beads, including the larger diameter bead, through the board. The configuration of the demonstrator provides a continuous path having three varying depths, from the reservoir, through the quincunx peg matrix and into the collection bins at the bottom of the board. This configuration provides a "hang-up" free flow of all the beads—including the single larger bead—as the beads collectively flow in just a few seconds from the bead reservoir at the top of the board to the bins at the bottom of the board.

Embodiments of the present invention may further include bead bins which have a configuration where each bead bin is divided into three longitudinal channels. Such a configuration may include a bead bin having a central channel disposed between an outer channel on each side. The central channel may have a greater depth than the two outer channels, where the depth is defined by the space between the inside surface of the front face and the inside surface of the rear panel. This unique configuration allows the use of the single larger bead while reducing the number of total beads required to achieve a visually attractive display.

Embodiments of the probability demonstrator may have a transparent housing in a rectangular configuration with rounded corners. The housing may be removably attached to a base member. When attached with the base member, the housing may be pivotable along a horizontal axis from a first position to a second position. The first position may be defined as the rest position described above. In this position, the bead reservoir has a higher elevation than the bead bins, allowing the beads to fall from the bead reservoir through the quincunx peg matrix to the bead bins. The second position may be defined where the bead bins have a higher elevation than the bead reservoir thereby allowing the beads to return from the bead bins to the bead reservoir.

The transparent housing may be fabricated from acrylonitrile butadiene styrene (ABS). If the beads are fabricated from stainless steel, the mass movement of the beads over the ABS material may induce a static charge. For this reason, an anti-static additive may be introduced to the ABS material to neutralize any electrostatic discharge which may otherwise impede the free flow of the beads.

The front face of the transparent housing may be printed with various surface graphics or may have transparent overlays affixed to all or part of the front face, which are hereinafter collectively referred to as "surface graphics." Such surface graphics may include a normal distribution curve (i.e., Bell Curve) on the lower face which overlays the bead bins to provide an easy comparison to the actual bead distribution in the bins. The surface graphics may also emphasize the configuration of the pegs to form Pascal's Triangle-a triangle of numbers which follow the rule of adding the two numbers above to get the number below. Each number overlaying a peg indicates the number of paths the beads may travel to arrive at each peg.

The surface graphics may provide other information on the front face of the transparent housing which may include a number on each of the hexagonal pegs which represent the likelihood that a bead starting at the top of the board will reach a particular point. The front face may further be printed with numbers for each of the fourteen bead bins, with the center bin assigned number 7, with the bins to the left of the center bin assigned consecutive numbers 0 through 6 and the bins to the right of the center bin assigned consecutive numbers 8 through 14. With the bins so numbered, if there are exactly 6,000 beads, the front face my include information which shows that the expected result is that 20.9 percent of the beads (i.e., approx. 1257 beads) will come to rest in the center bin, number 7, 18.3 percent of the beads (i.e., approx. 1100 beads) will come to rest in bins 6 and 8, 12.2 percent of the beads (i.e., approx. 733 beads) will come to rest in bins 5 and 9, 6.1 percent of the beads (i.e., approx. 367 beads) will come to rest in bins 4 and 10, 2.2 percent of the beads (i.e., approx. 133 beads) will come to rest in bins 3 and 11, 0.5 percent of the beads (i.e., approx. 33 beads) will come to rest in bins 2 and 12, 0.1 percent of the beads (i.e., approx. 5 beads) will come to rest in bins 1 and 13, and 0.0 percent (i.e., approx. 1 bead) will come to rest in bins 0 and 14.

The surface graphics may also show standard deviations on each side of the center bin, which for a normal distribution will show that about 68 percent of the beads come to rest within one standard deviation and about 95 percent of the beads come to rest within two standard deviations, 99.7 percent will come to rest within three standard deviations, 99.9 percent will come to rest within four standard deviations. The remaining few beads will be outliers, coming to rest in bins 0 and 14.

The surface graphics may also include a depiction of a teeter totter, conceived by one of the inventors herein, which illustrates Eugene Fama's efficient market hypothesis. This hypothesis states that prices of securities fully reflect all available information. The left side of the teeter totter represents all available information, and the right side represents the prices that millions of willing buyers and sellers have concluded are fair prices given that information at the time. There is a random and continuous flow of good news and forecasts and bad news and forecasts which at any point in time represent the uncertainty of the expected return of an investment that is held at a constant level of risk, such as a portfolio of 50% stocks and 50% bonds. If uncertainty increases due to bad news, the price must make an inversely proportional adjustment down so that the expected return remains essentially constant. The opposite is also true. For surface graphics comprising transparent overlays, the overlays may provide different allocations of stocks and bonds.

In describing the surface graphics which may be included on the front face of embodiments of the invention, it is to be understood that the printed information may be printed directly onto the front face of the probability demonstrator. Alternatively, clear overlays may be prepared which attach directly to the front face of embodiments of the invention. Such overlays may be of the type which may be removably attached to the front surface, so that a variety of different overlays may be utilized with a single device.

DETAILED DESCRIPTION OF THE INVENTION

Figure 1:
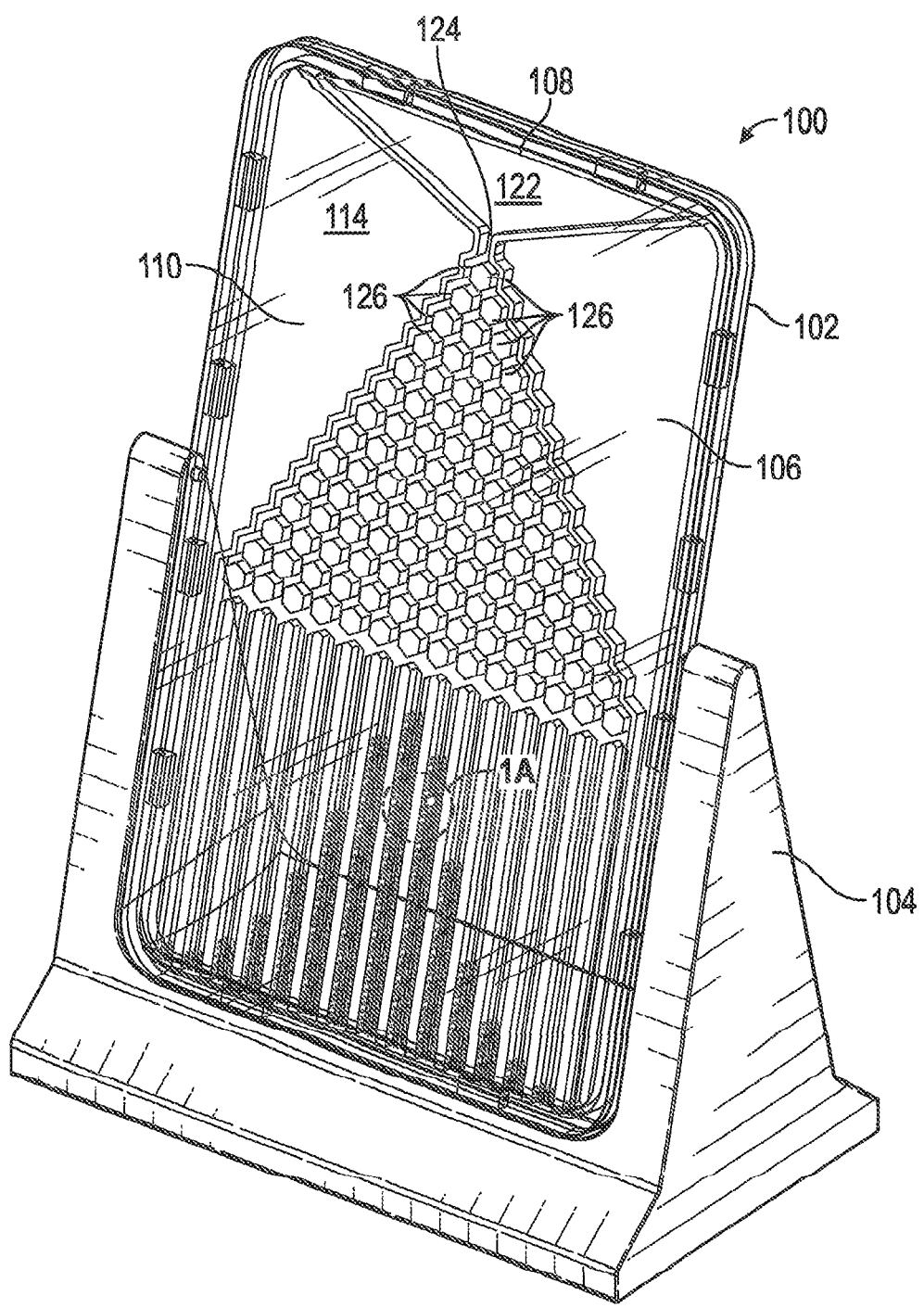
FIG. 1 shows a front perspective view of an embodiment of the probability demonstrator in the first position.

Referring now to the figures, FIGS. 1 through 7 shown an embodiment of the present probability demonstrator 100. An embodiment of the probability demonstrator comprises a housing 102 and a base 104. Housing 102 has an interior 106 having a top portion 108, a middle portion 110, and a bottom portion 112. Top portion 108, middle portion 110, and bottom portion 112 are consecutively arranged from top to bottom along axis A1. Housing 102 has a front face 114 and a rear panel 116. Housing 102 may be fabricated from a transparent ABS material which may include an anti-static additive to neutralize any static charge which may otherwise be caused by the mass movement of the beads through the housing.

A plurality of spherical beads 118 are contained within housing 102. An embodiment of the probability demonstrator may contain approximately 6000 spherical beads 118. Beads 118 will be fabricated from a material of sufficient weight to allow the beads to flow freely through different components of the housing 102. The Inventors herein have found that stainless-steel beads having a diameter of one millimeter provided satisfactory performance.

The plurality of beads 118 may also include a single larger diameter bead 120 having a diameter which is larger than the diameter of the other beads to facilitate a viewer's ability to distinguish the single bead 120 from the remaining beads. In one embodiment, each of the plurality of beads 118 may have a diameter of approximately one millimeter except the single larger diameter bead 120. For this embodiment, the single larger diameter bead may have a diameter of two millimeters or larger. To further facilitate distinguishing the single bead 120 from the other beads 118, the single bead 120 may be of a different color than the other beads. The Inventors herein have found that a single gold colored bead 120 having a diameter of approximately 2.2 millimeters allows the single bead to readily be distinguished from a remaining plurality of approximately 6000 beads 118 having a gray or stainless-steel finish and having a diameter of 1.0 millimeters.

A bead reservoir 122 is located in the top portion 108 of housing 102. Bead reservoir 122 is connected to middle portion 110 of housing 102 by a single conduit 124. Middle portion 110 as a plurality of pegs 126 which are configured as a quincunx matrix configured into Pascal's Triangle. In one embodiment of the invention, the upper row may have an upper row of one peg 126 and a bottom row of 14 pegs, for a total of 105 pegs 126. While the pegs may be in a variety of different shapes, the figures herein show each peg having a hexagonal shape.

Figure 2:
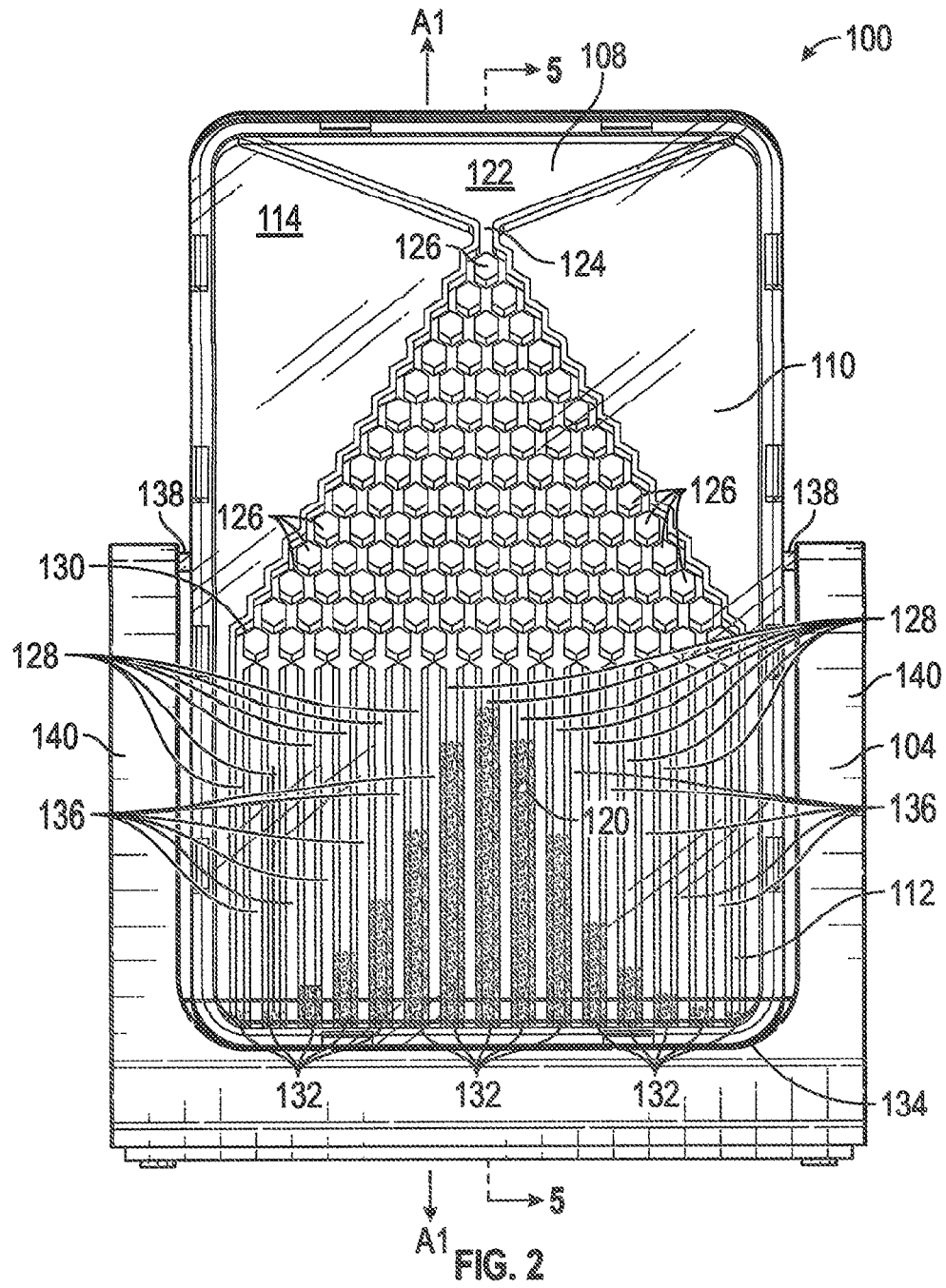
FIG. 2 shows a front view of an embodiment of the probability demonstrator.
Figure 3:
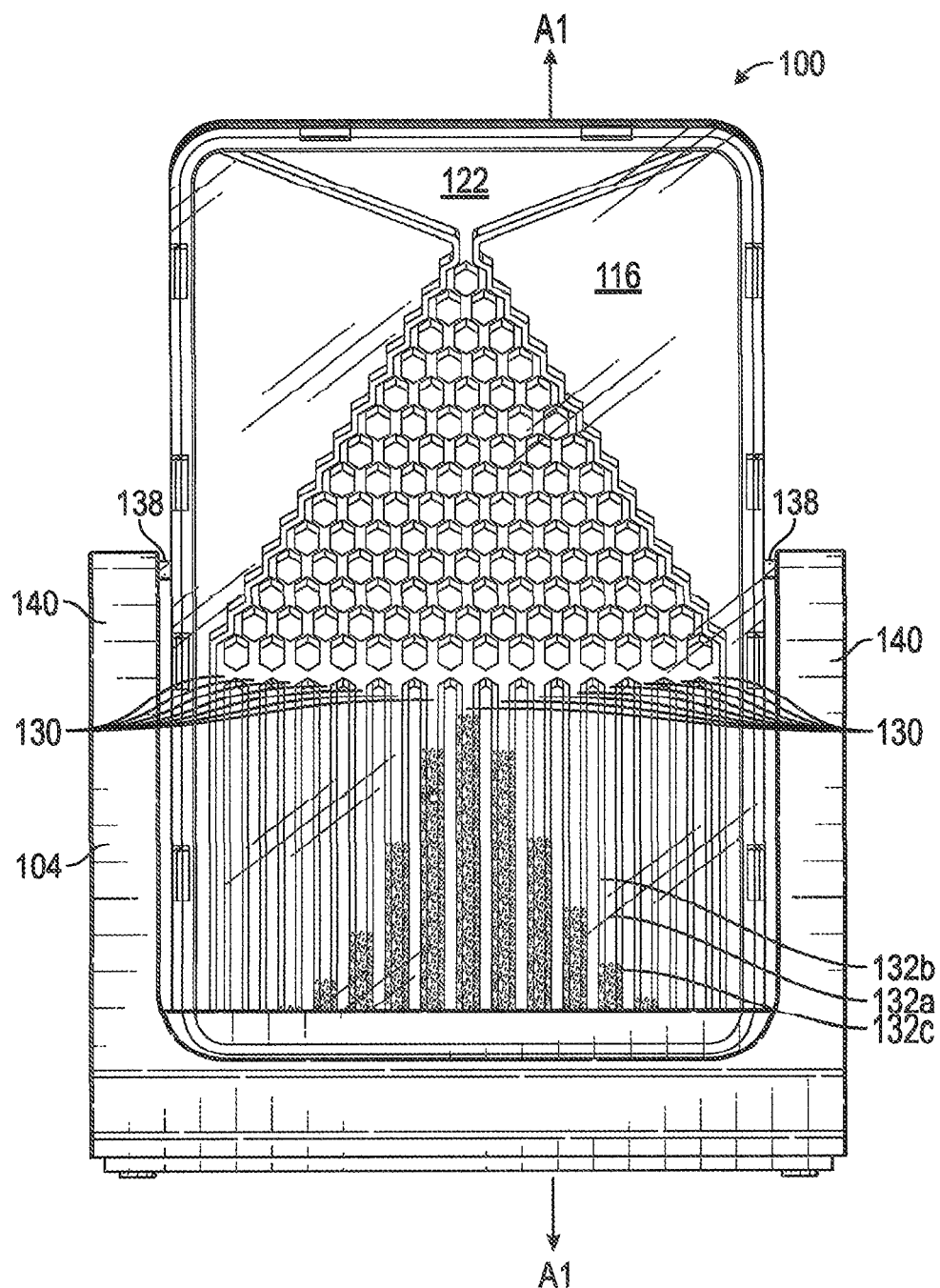
FIG. 3 shows a rear view of an embodiment of the probability demonstrator.
Figure 4:
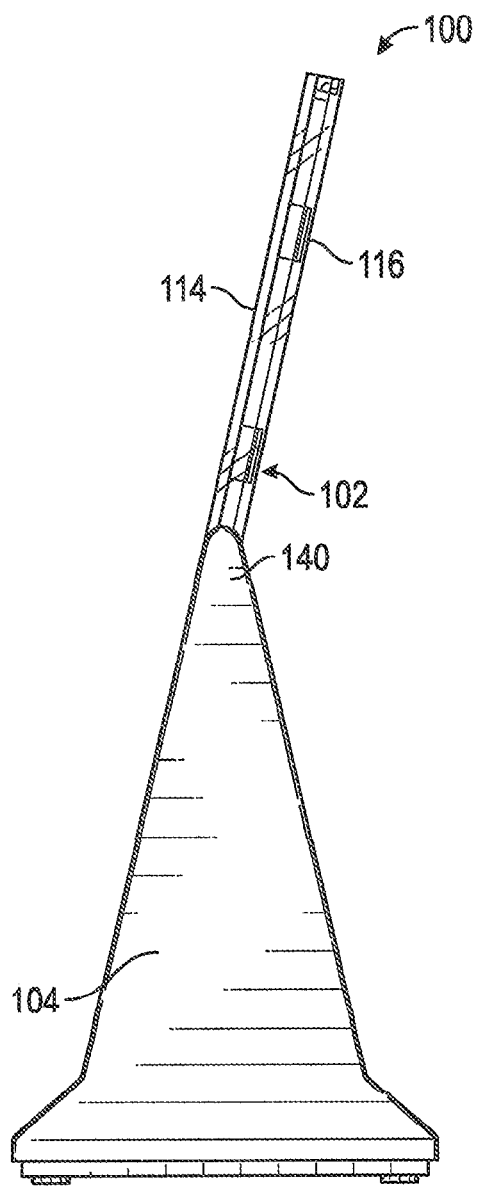
FIG. 4 shows a side view of an embodiment of the probability demonstrator.

A plurality of bead bins 128 may be disposed in a parallel configuration in the bottom portion 112 of the housing 102. Each bead bin 128 has an open end 130 which is adjacent to middle portion 110 and a closed end 132 which is adjacent to a bottom edge 134 of the bottom portion 112 of housing 102. Each of the bead bins 128 may be set apart from adjacent bead bins 128 by a divider 136. Dividers 136 allow the beads 118, 120 to fill the bead bins 128 and form a distinct histogram with dividers 136 separating each stack of beads within each bead bin 128 as shown in FIGS. 1-3.

Figure 5:
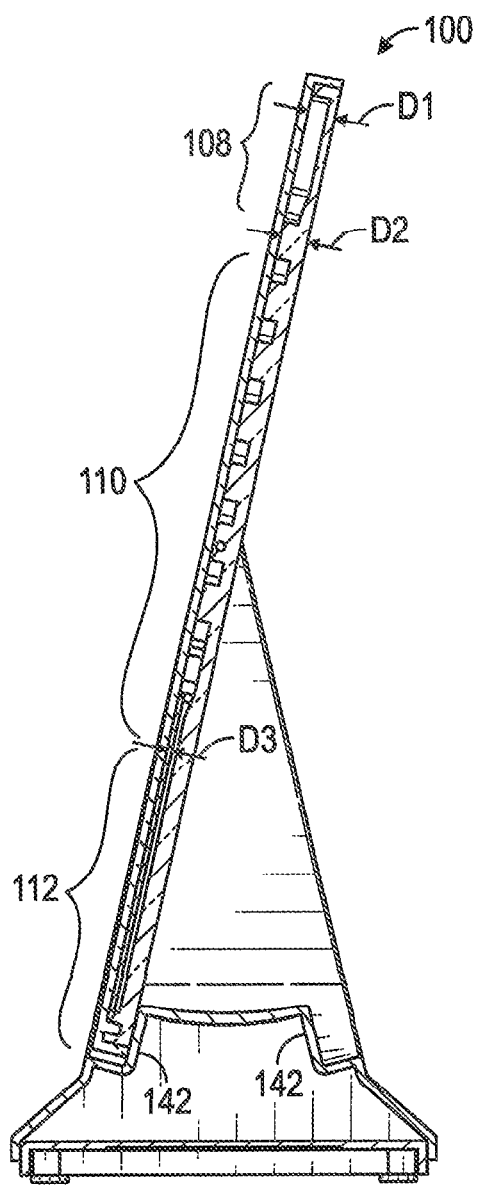
FIG. 5 shows a sectioned view of an embodiment of the probability demonstrator taken along line 5-5 of FIG. 2.

FIG. 5 shows the different depths of the open spaces (i.e., between the inside faces of front face 114 and rear panel 116) respectively through the top portion 108 having a depth $D_1$, the middle portion 110 having a depth $D_2$, and the bottom portion 112 having a depth $D_3$. The depths are configured such that $D_1$ is greater than $D_2$, which is greater than $D_3$. The depths are so arranged to facilitate a smooth flow of the plurality of beads 118 and the single larger diameter bead 120 through the length of housing 102 from the bead reservoir 122 through conduit 124 through the plurality of pegs 126 and into the bead bins 128.

Figure 1A:
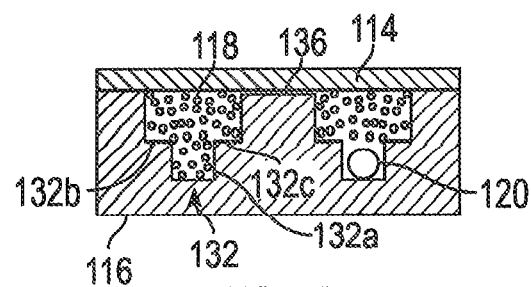
FIG. 1A shows a close-up view of sections of two adjacent bead bins from FIG. 1.

Bead bins 128 may be configured to have three distinct channels. FIG. 1A provides a sectioned view of adjacent bead bins 132 which are configured between front face 114 and rear panel 116. As shown in close-up view FIG. 1A and FIG. 3, each bead bin 132 may have a main channel 132a, a first adjacent side channel 132b and a second adjacent side channel 133c. It is to be appreciated that each of the bead bins 132 of the probability demonstrator 100 may be configured as the bin 132 shown in FIG. 3. Main channel 132a may have a greater depth between front face 114 and rear panel 116 than the respective depths of first adjacent side channel 132b and second adjacent side channel 132c. The depth of the main channel 132a is configured to receive single bead 120 while the depths of first adjacent side channel 132b and second adjacent side channel 132c are configured to receive any of the remaining plurality of bead 118 but not the single bead 120.

The above-described tri-channel configuration of each bead bin 132 provides a smooth flow of beads into the channels while also insuring that the single bead 120 will always be within a main channel 132a. This configuration facilitates an observer's ability to locate the single bead 120 while also providing a visually appealing histogram formed by the beads collected within the plurality of bead bins 132.

Figure 6:
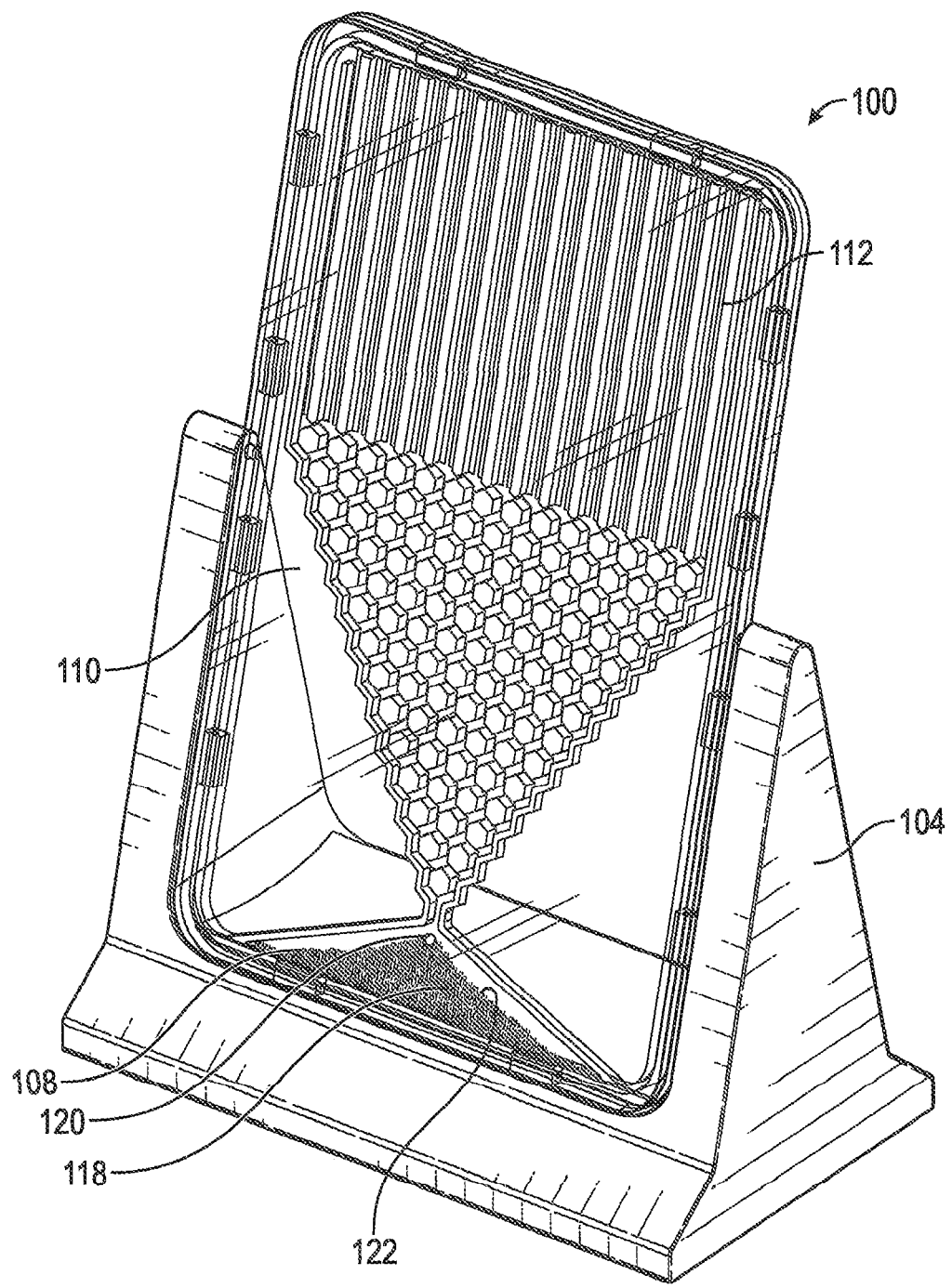
FIG. 6 shows a rear perspective view of an embodiment of the probability demonstrator in the second position.

FIG. 1 shows a front perspective view of the housing 102 in a first position while disposed within base 104. FIG. 6 shows a rear perspective view of the housing 102 in a second position while disposed in base 104. Housing 102 may be fabricated with outwardly extending pivot pins 138 which may be received within apertures located within each of the arms 140 of base 104. If base 104 is fabricated from a flexible material, such as plastic, housing 102 may be removably attached within base 104. As shown in FIG. 5, base 104 may be configured with a stop 142 which prevents further rotation of housing 102 within base 104. Stops 142 may be configured such that the front face 114 of housing 102 is positioned at approximately 76 degrees from horizontal to provide an attractive viewing angle for an observer. With the housing 102 so disposed within base 104, the housing may easily be rotated or flipped by a user from the first position to the second position to reload the beads into the bead reservoir 122. With this configuration, once the housing is rotated, the flow of approximately 6,000 beads 118 through restriction of approximately 3.5 millimeters back into the bead reservoir 122 occurs quickly without bead hang up or blockage. Flow the beads into the bead reservoir is both fast and consistent, allowing the device to be cycled quickly.

Figure 7:
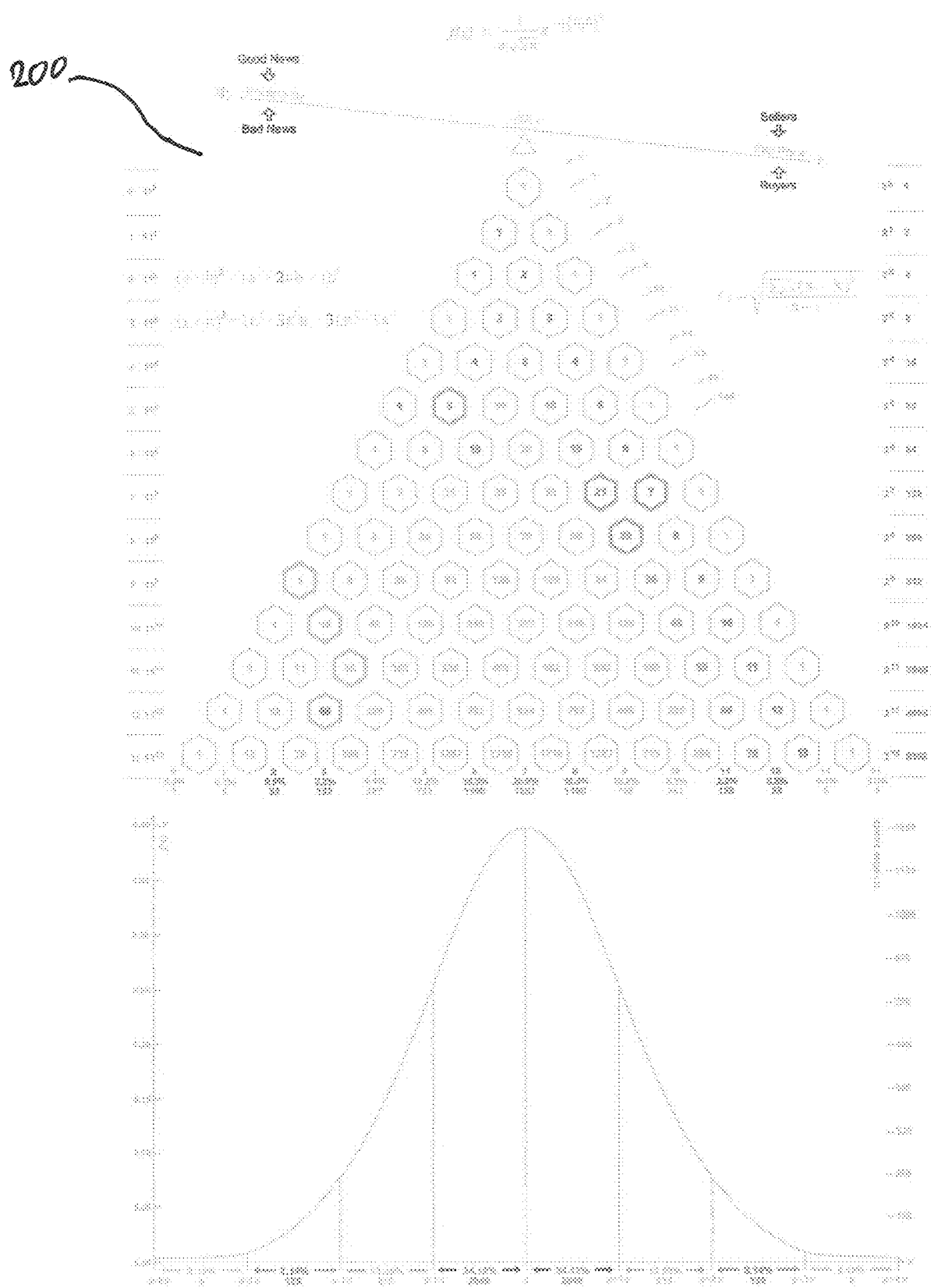
FIG. 7 shows various surface graphics which may either be printed directly onto the front face of the probability demonstrator, or which may be printed on an overlay which may be affixed to the front face of the probability demonstrator.

The front face 114 of the transparent housing 102 may comprise various surface graphics 200 as depicted in FIG. 7. The surface graphics 200 may be printed directly onto the front face 114 or the surface graphics may be printed on transparent overlays which may be affixed to all or part of the front face. The transparent overlays may be removably attached to the front face 114 with a variety of attachment mechanisms, including static clinging overlays, adhesive pinch dots, and the like.

The device may be manufactured with a molding process, with internal structural components, such as the pegs 126, fabricated as an integral part of the rear panel 116. The front face 114 may be attached to the rear panel 116 with interlocking attachment clips on the outside edges of the front face 114 and the rear panel, with adhesive, and/or plastic welding of the outside edges. The tops of some or all of the pegs 126 may also be ultrasonically welded to the inside surface of the front face 114 to provide additional points of attachment between the front face 114 and the rear panel 116.

Having thus described the preferred embodiment of the invention, what is claimed as new and desired to be protected by Letters Patent includes the following:

1. A probability demonstrator combines Pascal's Triangle with a Galton Board, the probability demonstrator comprising:
   a transparent housing having an interior comprising a top portion, a middle portion and a bottom portion, wherein the top portion, the middle portion and the bottom portion are consecutively arranged along an axis, the transparent housing further comprising a front face and a rear panel which enclose the interior, wherein a plurality of spherical beads is disposed within the interior;
   a bead reservoir disposed in the top portion, the bead reservoir connected to the middle portion by a single conduit, the bead reservoir having a first depth between an upper inside surface of the front face and an upper inside surface of the rear panel;
   a plurality of pegs disposed in the middle portion in a triangular shaped quincunx matrix configuration, the middle portion having a second depth between a middle inside surface of the front face and a middle inside surface of the rear panel; and
   a plurality of bead bins disposed in parallel configuration in the bottom portion, each bin having an open end adjacent the middle portion and a closed end adjacent a bottom edge of the bottom portion, each bin in parallel alignment with the vertical axis, the bottom portion having a third depth between a bottom inside surface of the front face and a bottom inside surface of the rear panel;
   wherein the first depth is greater than the second depth and the second depth is greater than the third depth and whereupon a disposition of the plurality of beads into the plurality of bead bins, a first single bead of the plurality of beads is distinguishable from the remainder of the plurality of beads.

2. The probability demonstrator of claim 1 wherein each of the pegs within the plurality of pegs comprises a hexagonal shape.

3. The probability demonstrator of claim 1 wherein the first single bead of the plurality of spherical beads comprises of a first single bead having a first color and all remaining beads of the plurality of spherical beads have a second color different from the first color.

4. The probability demonstrator of claim 3 wherein the first single bead has a diameter at least twice as large as all of the remaining beads.

5. The probability demonstrator of claim 4 wherein each of the plurality of bead bins comprises a center channel having a center channel depth disposed between a first outer channel having a first outer channel depth and a second outer channel having a second outer channel depth.

6. The probability demonstrator of claim 5 wherein the center channel depth is greater than the first outer channel depth and the second outer channel depth wherein the center channel depth is configured to receive the first single bead and the second outer channel depth is configured to prevent an entry of the first single bead.

7. The probability demonstrator of claim 1 wherein the front face of the transparent housing comprises a collection of surface graphics.

8. The probability demonstrator of claim 6 wherein the transparent housing is pivotally attached within a base member, wherein the transparent housing is pivotable from a first position where the bead reservoir has a higher elevation than the bead bins thereby allowing the beads to fall from the bead reservoir through plurality of hexagonal pegs to the bead bins and a second position where the bean bins have a higher elevation than the bead reservoir thereby allowing the beads to return from the bead bins to the bead reservoir.

9. The probability demonstrator of claim 1 wherein the transparent housing is fabricated from acrylonitrile butadiene styrene.

10. The probability demonstrator of claim 9 wherein an anti-static additive is mixed with the acrylonitrile butadiene styrene.

11. The probability demonstrator of claim 1 wherein the plurality of spherical beads comprises approximately six thousand spherical beads.

12. A probability demonstrator comprising:
   a transparent housing having an interior comprising a top portion, a middle portion and a bottom portion, wherein the top portion, the middle portion and the bottom portion are consecutively arranged along an axis, the transparent housing further comprising a front face and a rear panel which enclose the interior, wherein the top portion comprises a first depth between the front face and the rear panel, the middle portion comprises a second depth between the front face and the rear panel and the bottom portion comprises a third depth between the front face and the rear panel, wherein the first depth is greater than the second depth and the second depth is greater than the third depth, and wherein a plurality of spherical beads is disposed within the interior;

a bead reservoir disposed in the top portion, the bead reservoir connected to the middle portion by a single conduit;

a plurality of pegs disposed in the middle portion in a triangular matrix configuration; and a plurality of bead bins disposed in parallel configuration in the bottom portion, each bead bin having an open end adjacent the middle portion and a closed end adjacent a bottom edge of the bottom portion, each bin in parallel alignment with the vertical axis, wherein each of the plurality of bead bins comprises a center channel having a center channel depth disposed between a first outer channel having a first outer channel depth and a second outer channel having a second outer channel depth.

13. The probability demonstrator of claim 12 wherein each of the pegs within the plurality of pegs comprises a hexagonal shape.

14. The probability demonstrator of claim 12 wherein the center channel depth is greater than the first outer channel depth and the second outer channel depth.

15. The probability demonstrator of claim 12 wherein the plurality of spherical beads comprises approximately six thousand spherical beads, said plurality comprising a first single bead having a first color and all remaining beads of the plurality having a second color different from the first color.

16. The probability demonstrator of claim 15 wherein the first single bead has a diameter at least twice as large as the diameters of all of the remaining spherical beads.

17. The probability demonstrator of claim 12 wherein the transparent housing is pivotally attached within a base member, wherein the transparent housing is pivotable from a first position where the bead reservoir has a higher elevation than the bead bins thereby allowing the beads to fall from the bead reservoir through plurality of hexagonal pegs to the bead bins and a second position where the bean bins have a higher elevation than the bead reservoir thereby allowing the beads to return from the bead bins to the bead reservoir.

18. A probability demonstrator comprising:

a transparent housing having an interior comprising a top portion, a middle portion and a bottom portion, wherein the top portion, the middle portion and the bottom portion are consecutively arranged along an axis, the transparent housing further comprising a front face and a rear panel which enclose the interior, wherein the top portion comprises a first depth between the front face and the rear panel, the middle portion comprises a second depth between the front face and the rear panel and the bottom portion comprises a third depth between the front face and the rear panel, wherein the first depth is greater than the second depth and the second depth is greater than the third depth, and wherein a plurality of spherical beads is disposed within the interior, the plurality of spherical beads comprising a first single bead having a diameter at least twice as large as all of the remaining beads;

a bead reservoir disposed in the top portion, the bead reservoir connected to the middle portion by a single conduit;

a plurality of pegs disposed in the middle portion in a triangular matrix configuration; and a plurality of bead bins disposed in parallel configuration in the bottom portion, each bead bin having an open end adjacent the middle portion and a closed end adjacent a bottom edge of the bottom portion, each bin in parallel alignment with the vertical axis.

19. The probability demonstrator of claim 18 wherein each of the pegs within the plurality of pegs comprises a hexagonal shape.

20. The probability demonstrator of claim 18 wherein the first single bead of the plurality of spherical beads has a first color and all remaining beads of the plurality of spherical beads have a second color different from the first color.

21. The probability demonstrator of claim 18 wherein the transparent housing is pivotally attached within a base member, wherein the transparent housing is pivotable from a first position where the bead reservoir has a higher elevation than the bead bins thereby allowing the beads to fall from the bead reservoir through plurality of pegs to the bead bins and a second position where the bean bins have a higher elevation than the bead reservoir thereby allowing the beads to return from the bead bins to the bead reservoir.

22. The probability demonstrator of claim 18 wherein the plurality of spherical beads comprises approximately six thousand spherical beads.

23. The probability demonstrator of claim 18 wherein each of the plurality of bead bins comprises a center channel having a center channel depth disposed between a first outer channel having a first outer channel depth and a second outer channel having a second outer channel depth.

\* \* \* \* \*